US012691791B2

(12) United States Patent
Han

(10) Patent No.: US 12,691,791 B2
(45) Date of Patent: Jul. 28, 2026

(54) FUEL CELL VEHICLE CONTROL SYSTEM AND METHOD

(71) Applicants:Hyundai Motor Company, Seoul (KR); Kia Corporation, Seoul (KR)

(72) Inventor: Wook Hyun Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 852 days.

(21) Appl. No.: 18/099,401

(22) Filed: Jan. 20, 2023

(65) Prior Publication Data

US 2024/0100997 A1 Mar. 28, 2024

(30) Foreign Application Priority Data

Sep. 26, 2022 (KR) ........................ 10-2022-0121624

(51) Int. Cl.
| | |
|---|---|
| B60L 58/30 | (2019.01) |
| B60L 50/70 | (2019.01) |
| H02J 7/60 | (2026.01) |

(52) U.S. Cl.
CPC .............. B60L 58/30 (2019.02); B60L 50/70 (2019.02); H02J 7/663 (2026.01)

(58) Field of Classification Search
CPC ........... B60L 58/30; B60L 58/40; B60L 50/75
USPC ....................................................... 320/109
See application file for complete search history.

(56) References Cited

U.S. PATENT DOCUMENTS

| | | | | |
|---|---|---|---|---|
| 2022/0314817 A1* | 10/2022 | Igarashi | .................. | B60L 58/12 |
| 2023/0036318 A1* | 2/2023 | Kim | .................... | B60W 40/076 |
| 2023/0150399 A1* | 5/2023 | Zhou | ........................ | B60L 58/13 |
| 2024/0123841 A1* | 4/2024 | Tomimoto | .............. | B60L 15/20 |

FOREIGN PATENT DOCUMENTS

| | | |
|---|---|---|
| EP | 1918154 A2 | 5/2008 |
| JP | 1996-051701 | 2/1996 |
| JP | 2010-149679 | 7/2010 |
| JP | 2011-504355 | 2/2011 |
| KR | 10-0439144 | 7/2004 |
| KR | 10-1451668 | 10/2014 |
| KR | 10-2018-0070398 | 6/2018 |
| WO | WO2002/089290 | 11/2002 |
| WO | WO2009/058460 | 5/2009 |

* cited by examiner

*Primary Examiner* — Nathaniel R Pelton
(74) *Attorney, Agent, or Firm* — MORGAN, LEWIS & BOCKIUS LLP

(57) ABSTRACT

A fuel cell vehicle control system and method includes a map storage configured to store a plurality of fuel cell maps regarding power generation of fuel cells of a vehicle, a monitoring unit configured to determine a degree of a charging load and a degree of a discharging load of a battery of the vehicle, and a controller configured to select a fuel cell map from among the fuel cell maps stored in the map storage depending on the degree of the charging load and the degree of the discharging load of the battery of the vehicle, determined by the monitoring unit, and to control power generation of the fuel cells depending on the selected fuel cell map.

18 Claims, 5 Drawing Sheets

<output-type map>

<energy efficiency-type map>

FUEL CELL VEHICLE CONTROL SYSTEM AND METHOD

CROSS-REFERENCE TO RELATED APPLICATION

The present application claims priority to Korean Patent Application No. 10-2022-0121624, filed on Sep. 26, 2022, the entire contents of which is incorporated herein for all purposes by this reference.

BACKGROUND OF THE PRESENT DISCLOSURE

Field of the Present Disclosure

The present disclosure relates to a fuel cell vehicle control system and method which control power generation of fuel cells to stably maintain the load of a battery.

DESCRIPTION OF RELATED ART

The spread of eco-friendly vehicles, such as electric vehicles (EVs) is recently expanded due to environmental issues of internal combustion vehicles, and in general, electric vehicles (EVs) are referred to as vehicles that drive using driving force of a motor driven by electrical energy.

These electric vehicles (EVs) include a hybrid electric vehicle (HEV) that provides driving force to a motor using electrical energy stored in a high-voltage battery for vehicles in addition to the conventional internal combustion engine, a fuel cell electric vehicle (FCEV) that provides driving force to a motor using electrical energy generated by fuel cells, etc.

The fuel cells mounted in the fuel cell electric vehicle are devices which receive hydrogen and air supplied from the outside thereof and generate electrical energy through electrochemical reactions in a fuel cell stack.

A fuel cell system applied to the fuel cell electric vehicle includes the fuel cell stack formed by stacking a plurality of fuel cells used as a power source, a fuel cell supply system configured to supply hydrogen provided as fuel to the fuel cell stack, an air supply system configured to supply oxygen provided as an oxidizer necessary for the electrochemical reactions, and a thermal management system using a coolant or the like to control the temperature of the fuel cell stack.

The fuel cell electric vehicle may satisfy the demand output of the vehicle through the fuel cell stack and a battery. In the case in which the output of the fuel cell stack is greater than the demand output of the vehicle, remaining power is used to charge the battery, and output generated by regenerative braking of the vehicle is stored in the battery. Furthermore, the output of the fuel cell stack is determined depending on a fuel cell map relating to power generation of the fuel cells of the vehicle. In general, the output of the fuel cell stack increases as the state of charge (SOC) value of the battery decreases, and increases as the demand output of the vehicle increases. This will be described below with reference to FIG. 1, FIG. 2, FIG. 3, and FIG. 4.

FIG. 1 and FIG. 2 are graphs representing characteristics of an output-type map in which the output of a fuel cell stack is varied depending on the demand output of a vehicle in a fuel cell system. In the output-type map, the output of the fuel cell stack satisfies the demand output of the vehicle without using the output of a battery as much as possible. In the output-type map, most of the demand output of the vehicle is handled by the fuel cell stack, and thus, there is an advantage in that the load of the battery is minimized. However, as shown in FIG. 2, in the case in which the demand output of the vehicle is high depending on a driving situation, the fuel cell stack should bear the demand output of the vehicle, and the fuel cell stack alone should bear the demand output of the vehicle, and has high cooling consumption and poor energy efficiency because the heating value of the fuel cell stack is excessively increased as the output of the fuel cell stack increases due to characteristics of the fuel cell stack.

FIG. 3 and FIG. 4 are graphs representing characteristics of an energy efficiency-type map in which the electrical energy efficiency of a vehicle is optimized in a fuel cell system. In the energy efficiency-type map, the output of a battery is used, and a fuel cell stack outputs power as much as a mean output regardless of the demand output of the vehicle. In the energy efficiency-type map, as shown in FIG. 4, in the case in which the demand output of the vehicle is higher than the mean output depending on a driving situation, the battery is discharged, and in the case in which the demand output of the vehicle is less than the mean output, the battery is charged. Here, the fuel cell stack generates low output always, compared to the output-type map, and thus, the cooling consumption of the fuel cell stack is low and the energy efficiency of the vehicle is increased.

Wide-area buses and intra-city buses are driven at different speeds and altitudes depending on a bus route, and the charging output of a battery may be varied in real time due to the configuration of a fuel cell map and regenerative braking. At the instant time, when the charging output of the battery is excessively increased, the load of the battery is increased and may thus cause a fire due to swelling of the battery. Therefore, a plan for varying the fuel cell map and the regenerative braking amount of the battery depending on a bus route and a driving situation is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a fuel cell vehicle control system and method which select a fuel cell map depending on degrees of the charging and discharging loads of a vehicle battery, and may thus control power generation of fuel cells to reduce the load of the vehicle battery and to prevent a fire from breaking out due to overload of the battery.

In accordance with an aspect of the present disclosure, the above and other objects may be accomplished by the provision of a fuel cell vehicle control system including a map storage configured to store a plurality of fuel cell maps regarding power generation of fuel cells of a vehicle, a monitoring unit configured to determine a degree of a charging load and a degree of a discharging load of a battery of the vehicle, and a controller configured to select a fuel cell map from among the fuel cell maps stored in the map storage depending on the degree of the charging load and the degree of the discharging load of the battery of the vehicle, determined by the monitoring unit, and to control the power generation of the fuel cells depending on the selected fuel cell map.

The fuel cell maps may include an output-type map configured so that an output of the fuel cells is varied depending on a demand output of the vehicle, and an energy efficiency-type map configured so that electrical energy efficiency of the vehicle is maximized.

The monitoring unit may determine charging and discharging currents per unit capacity of the battery of the vehicle as the degree of the charging load and the degree of the discharging load of the battery of the vehicle.

The charging and discharging currents of the battery of the vehicle may be determined by Equation below, $$\sqrt{(\sum_{a=1}^{n} Da2 + \sum_{b=1}^{n} Cb2)/t},$$

and

Da may indicate discharging current by time, Cb may indicate charging current by time, and t may be a determination time.

The controller may compare the degree of the charging load and the degree of the discharging load of the battery with each other, and may select the output-type map stored in the map storage when the degree of the discharging load is greater than the degree of the charging load.

The controller may compare the degree of the charging load and the degree of the discharging load of the battery with each other, and may determine a degree of regenerative braking of the vehicle when the degree of the discharging load is less than the degree of the charging load.

The controller may select the output-type map stored in the map storage or reduce a regenerative braking amount of the vehicle depending on the determined degree of the regenerative braking of the vehicle.

The controller may reduce the regenerative braking amount of the vehicle by turning off an endurance brake integration (EBI) function of the vehicle, upon concluding that the endurance brake integration (EBI) function of the vehicle is on and thus the degree of the regenerative braking of the vehicle is maximized.

The controller may reduce the regenerative braking amount of the vehicle by decreasing a level of the regenerative braking of the vehicle, upon concluding that the endurance brake integration (EBI) function of the vehicle is off.

In accordance with another aspect of the present disclosure, there is provided a fuel cell vehicle control method including determining, by a monitoring unit, a degree of a charging load and a degree of a discharging load of a battery of a vehicle, selecting, by a controller, a fuel cell map from among a plurality of fuel cell maps stored in a map storage depending on the degree of the charging load and the degree of the discharging load of the battery of the vehicle, determined by the monitoring unit, and controlling, by the controller, power generation of the fuel cells based on the selected fuel cell map.

In determining the degree of the charging load and the degree of the discharging load of the battery of the vehicle, the monitoring unit may determine charging and discharging currents per unit capacity of the battery of the vehicle as the degree of the charging load and the degree of the discharging load of the battery of the vehicle.

The fuel cell maps may include an output-type map configured so that an output of the fuel cells is varied depending on a demand output of the vehicle, and an energy efficiency-type map configured so that electrical energy efficiency of the vehicle is maximized, and in selecting the fuel cell map from among the plurality of fuel cell maps stored in the map storage, the controller may compare the degree of the charging load and the degree of the discharging load of the battery with each other, and may select the output-type map stored in the map storage when the degree of the discharging load is greater than the degree of the charging load.

The fuel cell vehicle control method may further include comparing, by the controller, the degree of the charging load and the degree of the discharging load of the battery with each other, and determining a degree of regenerative braking of the vehicle when the degree of the discharging load is less than the degree of the charging load.

The fuel cell vehicle control method may further include selecting, by the controller, the output-type map stored in the map storage or reducing a regenerative braking amount of the vehicle depending on the determined degree of the regenerative braking of the vehicle.

In reducing the regenerative braking amount of the vehicle, the controller may reduce the regenerative braking amount of the vehicle by turning off an endurance brake integration (EBI) function of the vehicle, upon concluding that the endurance brake integration (EBI) function of the vehicle is on and thus the degree of the regenerative braking of the vehicle is maximized.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
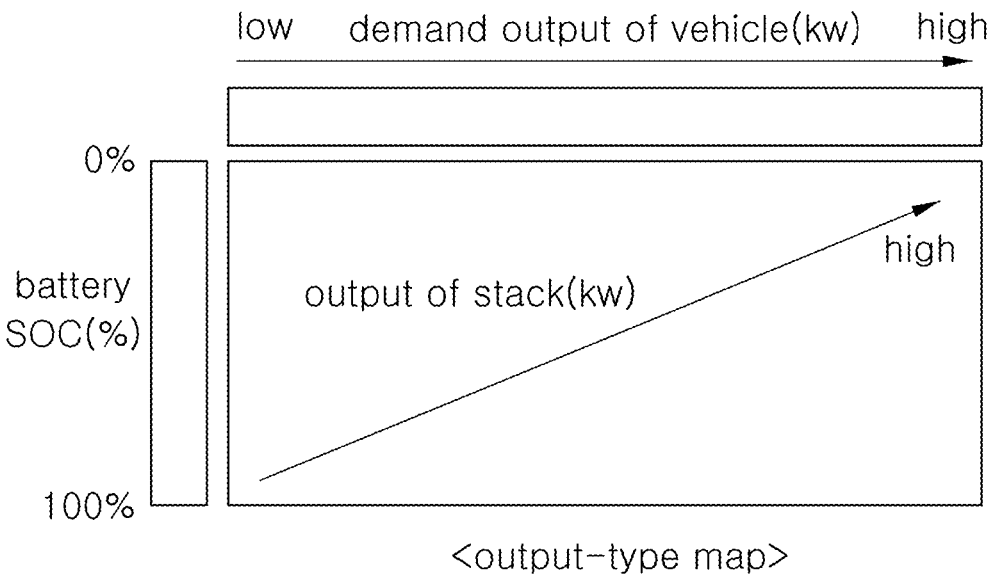
FIG. 1 and FIG. 2 are graphs representing characteristics of an output-type map in which the power generation amount of a fuel cell stack is varied depending on the demand output of a vehicle in a fuel cell system.
Figure 2:
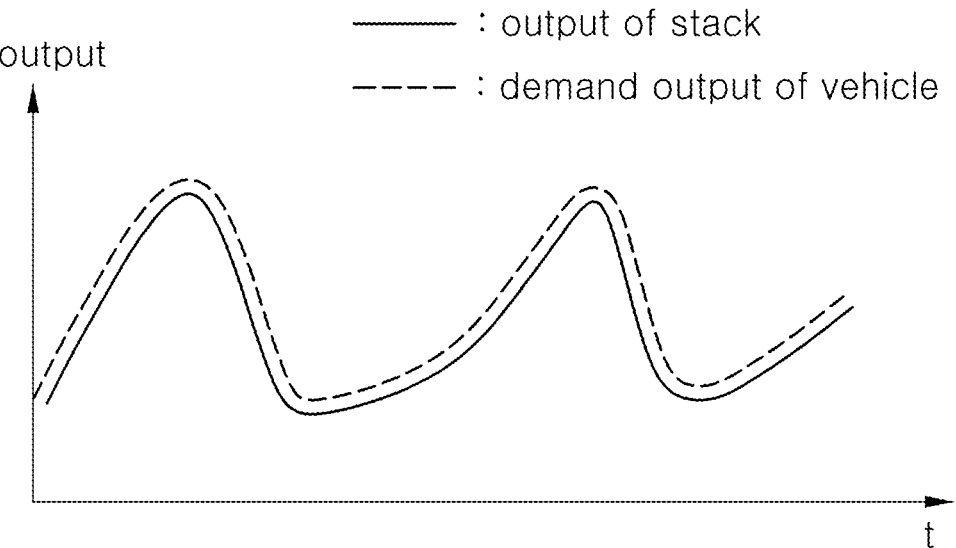
Figure 3:
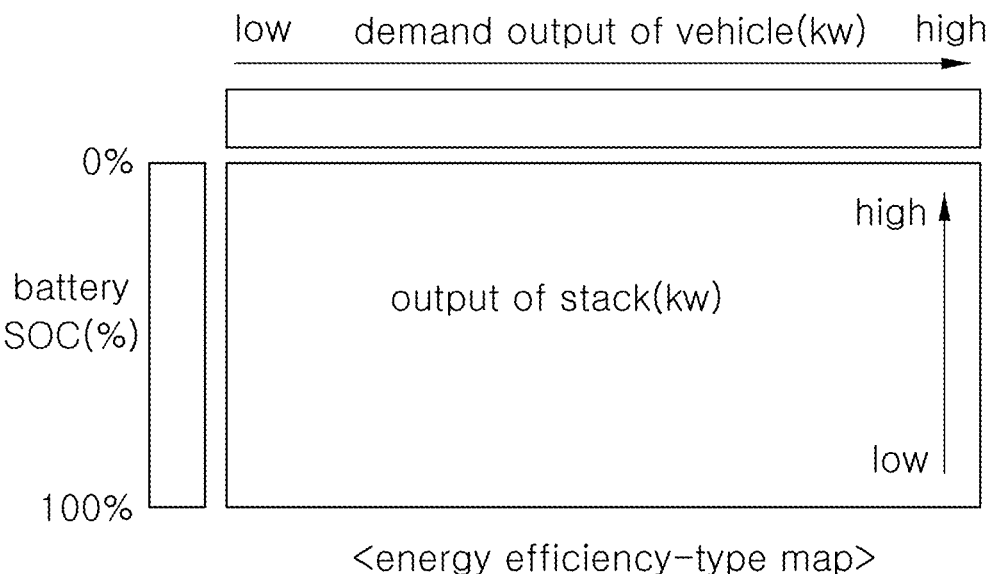
FIG. 3 and FIG. 4 are graphs representing characteristics of an energy efficiency-type map in which the energy efficiency of a vehicle is optimized in a fuel cell system.
Figure 4:
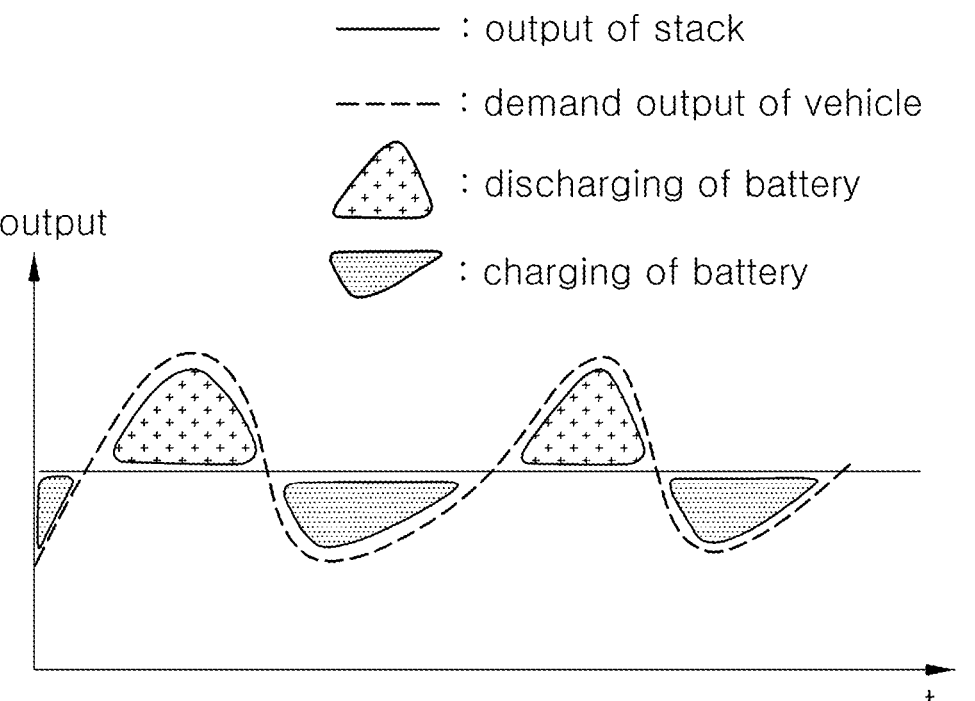

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present disclosure is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to exemplary embodiments of the present disclosure, examples of which are illustrated in the accompanying drawings. Wherever possible, the same reference numbers will be used throughout the drawings to refer to the same or like parts.

In the following description of the embodiments, suffixes, such as "module", "part" and "unit", are provided or used interchangeably merely in consideration of ease in statement of the specification, and do not have meanings or functions distinguished from one another.

In the following description of the exemplary embodiments of the present disclosure, a detailed description of known functions and configurations incorporated herein will be omitted when it may make the subject matter of the present disclosure rather unclear. Furthermore, the accompanying drawings will be exemplarily provided to describe the exemplary embodiments of the present disclosure, and should not be construed as being limited to the exemplary embodiments set forth herein, and it will be understood that the exemplary embodiments of the present disclosure are provided only to completely include the present disclosure and cover modifications, equivalents or alternatives which come within the scope and technical range of the present disclosure. In the following description of the embodiments, terms, such as "first" and "second", are used only to describe various elements, and these elements should not be construed as being limited by these terms. These terms are used only to distinguish one element from other elements.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present.

As used herein, singular forms may be intended to include plural forms as well, unless the context clearly indicates otherwise.

In the following description of the embodiments, the terms "comprises," "comprising," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Furthermore, the term "unit" included in the names of "motor control unit (MCU)", "hybrid control unit (HCU)", etc. is widely used to name a controller configured to control a specific function of a vehicle, and does not mean a generic functional unit.

A controller may include a communication device configured to communicate with other controllers or sensors to control the functions of the controller, a memory configured to store operating systems or logic commands and input and output information, and at least one processor configured to perform determination, calculation, decision, etc. required to control the functions of the controller.

Prior to description of fuel cell vehicle control systems according to the exemplary embodiments of the present disclosure, a fuel supply system for fuel cell vehicles which is applicable to the exemplary embodiments will be described first.

The fuel supply system decompresses compressed hydrogen in a hydrogen tank and then supplies the decompressed hydrogen to an anode (i.e., a fuel electrode) of each fuel cell of the fuel cell stack, and an air supply system operates an air compressor to absorb external air and supplies the absorbed external air to a cathode (i.e., an air electrode) of each fuel cell of the fuel cell stack.

When hydrogen is supplied to the anode in the fuel cell stack, oxidation reaction of hydrogen occurs at the anode and generates protons and electrons, and the generated electrons and protons migrate to the cathode through an electrolyte membrane and separators, respectively. Water is generated at the cathode through electrochemical reactions, in which the protons and electrons migrated from the anode and oxygen in air participate, and electrical energy is produced through the flow of the electrons.

When hydrogen is supplied to the anode and oxygen is supplied to the cathode in the fuel cell stack, protons are separated through catalyst reaction at the anode. The separated protons migrate to the cathode, i.e., an oxidation electrode, through the electrolyte membrane, and the protons, the electrons and oxygen cause electrochemical reactions at the oxidation electrode and thus produce electrical energy. Concretely, the electrochemical oxidation of hydrogen occurs at the anode, electrochemical reduction of oxygen occurs at the cathode, electricity and heat are produced due to migration of the generated electrons, and vapor or water is generated between chemical bonding between hydrogen and oxygen.

A discharge device configured to discharge by-products, such as vapor or water and heat, generated during the process of producing electrical energy of the fuel cell stack, and unreacted hydrogen and oxygen is provided, and gases, such as vapor, hydrogen and oxygen, are discharged to the atmosphere through an exhaust passage.

The electrochemical reactions occurring in the fuel cell are represented by reaction formulae, as below.

$$2H_2(g) \rightarrow 4H^+(aq.) + 4e^- \qquad \text{[Reaction at Anode]}$$

$$O_2(g) + 4H^+(aq.) + 4e^- \rightarrow 2H_2O(l) \qquad \text{[Reaction at Cathode]}$$

$$2H_2(g) + O_2(g) \rightarrow 2H_2O(l) + \text{Electrical Energy} + \text{Thermal Energy} \qquad \text{[Whole Reaction]}$$

As represented in the above reaction formulae, hydrogen molecules are decomposed into four protons and four electrons. The electrons migrate to the cathode through an external circuit and thus produce current (electrical energy), and the protons migrate to the cathode through the electrolyte membrane and thus cause reduction reaction and generate water and heat as the by-products.

An exemplary embodiment of the present disclosure is directed to providing that a fuel cell map and the regenerative breaking amount of a vehicle battery are varied depending on the a degree of a charging load and a degree of a discharging load of the vehicle battery.

Figure 5:
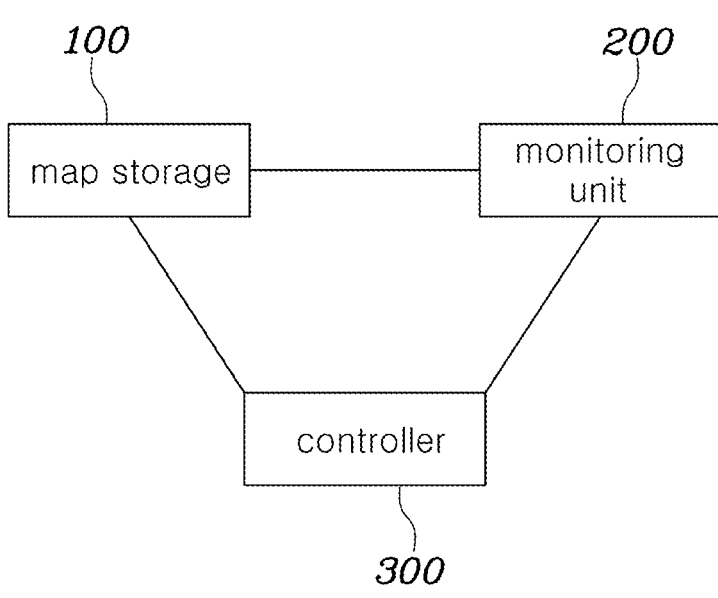
FIG. 5 is a block diagram of a fuel cell vehicle control system according to an exemplary embodiment of the present disclosure.

FIG. 5 is a block diagram of a fuel cell vehicle control system according to various exemplary embodiments of the present disclosure.

Referring to FIG. 5, a map storage 100 may store a plurality of fuel cell maps regarding power generation of the fuel cells of a vehicle. The fuel cell maps may include an output-type map in which the power generation amount of the fuel cells is varied depending on the demand output of the vehicle, and an energy efficiency-type map in which the energy efficiency of the vehicle is optimized, without being limited thereto. A driver may increase the energy efficiency of the vehicle by driving the vehicle based on the energy efficiency-type map at the start of driving. Furthermore, the driver may set the regenerative braking mode of the vehicle. Hereinafter, it will be assumed that the regenerative braking mode may be set to a multi-stage mode including level 0 to level 2 which are divided depending on the regenerative braking amount, and the on or off mode of the endurance brake integration (EBI) function of the vehicle, in which the regenerative braking of the vehicle may be maximized, may be set depending on a brake pedal sensor (BPS).

Furthermore, a monitoring unit 200 may determine the amounts of the charging and discharging loads of the vehicle battery.

Figure 6:
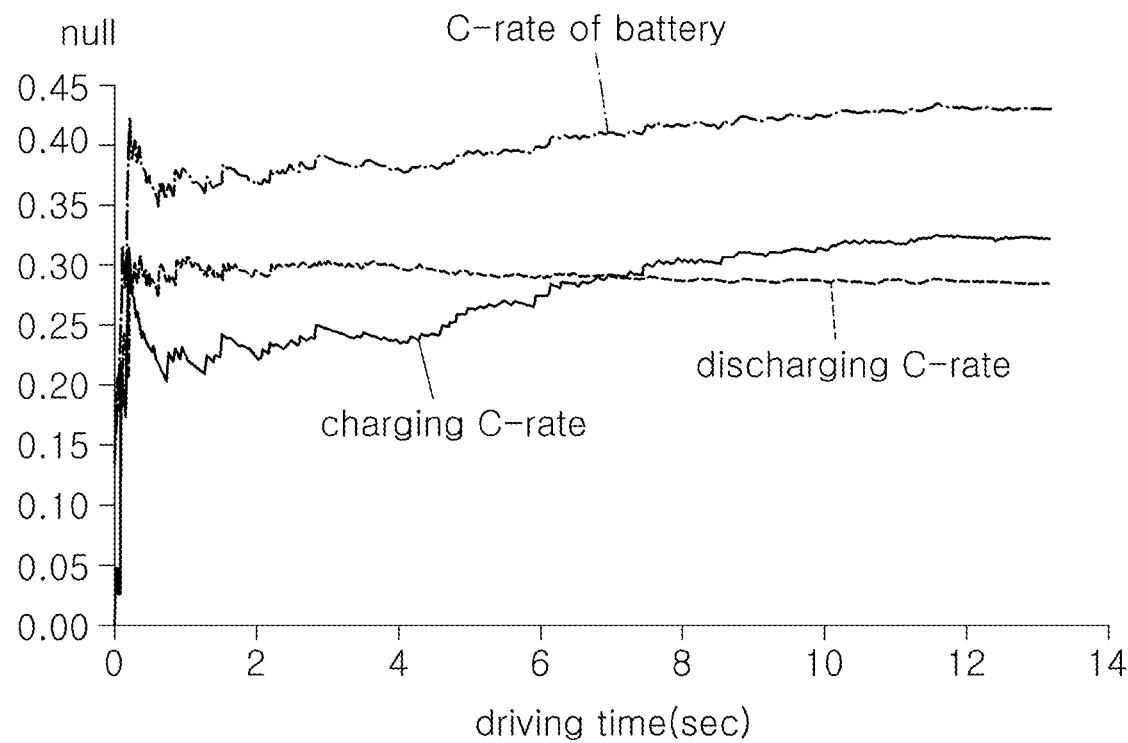
FIG. 6 is a graph representing one example of relations between a driving time and the charging and discharging loads of a vehicle battery.

FIG. 6 is a graph representing one example of relations between a driving time and the charging and discharging loads of the vehicle battery.

Referring to FIG. 6, the monitoring unit 200 may determine charging and discharging currents per unit capacity of the vehicle battery as the degree of the charging load and the degree of the discharging load. Concretely, the charging and discharging currents of the vehicle battery may be determined by Equation below.

$$\sqrt{(\sum_{a=1}^{n} Da2 + \sum_{b=1}^{n} Cb2)/t}$$

Here, Da indicates discharging current by time, Cb indicates charging current by time, and t is a determination time.

The charging and discharging currents of the battery per unit capacity may be referred to as a C-rate. The charging current of the battery per unit capacity and the discharging current of the battery per unit capacity may be referred to a charging C-rate and a discharging C-rate, respectively. The charging and discharging currents of the battery per unit capacity may be determined by dividing the sum total, of the sum of squares of the charging current by time and the sum of squares of the discharging current by time, by the determination time, and by determining the square root of a value obtained by dividing the sum total by the determination time. The charging and discharging loads are increased as the determined charging and discharging currents per unit capacity are increased, and are decreased as the determined charging and discharging currents per unit capacity are decreased. As shown in FIG. 6, because it may be confirmed that the charging C-rate of the battery is more excessive at the early stage of driving of the vehicle, but the discharging C-rate of the battery is more excessive after the mid stage of driving of the vehicle, the cause for the excessive C-rate of the battery is varied depending on the driving route of the vehicle.

Here, the controller 300 may determine whether or not the current driving condition of the vehicle is maintained or another-type fuel cell map is selected depending on the determined charging and discharging currents per unit capacity. More concretely, when the determined C-rate of the battery is less than 90% of a predetermined upper limit of the C-rate of the battery, the controller 300 may determine that the degree of the charging load and the degree of the discharging load of the battery are not great, and may thus maintain the current driving condition. 90% of the upper limit of the C-rate of the battery is exemplary and is thus not limited thereto, and may be varied depending on the kind of the vehicle, the state of the battery and external factors. Furthermore, the C-rate of the battery may be determined every 2 hours or every day, and such a time is exemplary, and is not limited thereto.

However, when the determined C-rate of the battery exceeds 90% of the predetermined upper limit of the C-rate of the battery, the controller 300 may determine that the degree of the charging load and the degree of the discharging load of the battery are not great, and may thus determine a cause for the excessive C-rate of the battery through comparison between the degree of the charging load and the degree of the discharging load. The degree of the charging load and the degree of the discharging load may be compared with each other by comparing the charging C-rate and the discharging C-rate with each other. The case in which the discharging C-rate is greater than the charging C-rate is the case in which the discharging load is greater than the charging load, and in the instant case, the controller 300 may change the fuel cell map from the energy efficiency-type map to the output-type map. Here, the controller 300 may control power generation of the fuel cells based on the output-type map. On the other hand, the case in which the charging C-rate is greater than the discharging C-rate is the case in which the charging load is greater than the discharging load, and in the instant case, to determine whether or not the excessive charging load is caused by the regenerative braking of the vehicle or power generation of the fuel cell stack, the controller 300 may determine the degree of the regenerative braking of the vehicle.

Here, the degree of the regenerative braking of the vehicle may be determined by comparing the regenerative braking amount of the vehicle expressed as a value, obtained by multiplying the torque of the motor, caused by counter electromotive force, by the revolutions per minute (rpm) of the motor, with 50% of the full state of charge (SOC) value of the battery while driving of the vehicle. For example, when 50% of the full SOC value of the battery while driving of the vehicle is greater than the regenerative braking amount of the vehicle, the controller 300 may determine that the output of the fuel cell stack is excessive and may thus select the output-type map. On the other hand, when the regenerative braking amount of the vehicle is greater than 50% of the full SOC value of the battery while driving of the vehicle, the controller 300 may determine that half or more of the full SOC value of the battery results from the regenerative braking of the vehicle, and may thus reduce the regenerative braking amount of the vehicle. 50% of the full SOC value of the battery while driving of the vehicle is exemplary and is thus not limited thereto, and may be varied depending on the kind of the vehicle, the state of the battery and external factors.

More concretely, there are various methods of reducing the regenerative braking amount of the vehicle. When the charging and discharging currents per unit capacity are higher than a limiting condition, the charging C-rate is greater than the discharging C-rate, and the regenerative braking amount of the vehicle is greater than a designated ratio of the full SOC value of the battery, the controller 300 may determine that requirements to reduce the regenerative braking amount of the vehicle are satisfied. When such requirements are satisfied, the controller 300 may determine whether or not the on or off mode of the endurance brake integration (EBI) function of the vehicle is set.

Figure 7:
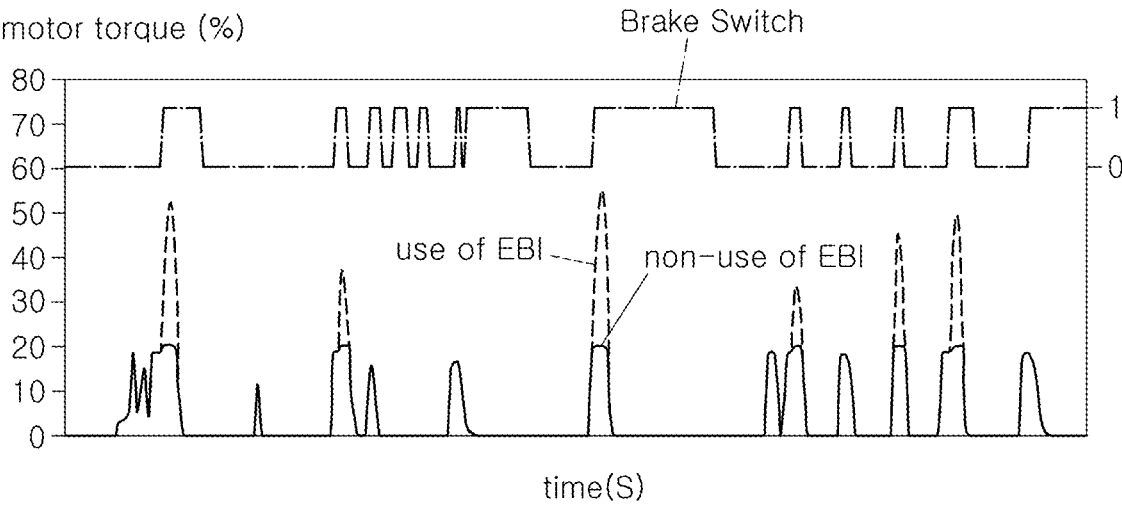
FIG. 7 is a graph representing a change in an energy recovery amount of motor torque depending on whether the endurance brake integration (EBI) function of a vehicle is on or off.

FIG. 7 is a graph representing a change in an energy recovery amount of motor torque depending on whether the endurance brake integration (EBI) function of the vehicle on or off.

Referring to FIG. 7, in the state in which the endurance brake integration (EBI) function, in which the regenerative braking of the vehicle is maximally maintained, is set, the controller may reduce the regenerative braking amount of the vehicle by turning off the endurance brake integration (EBI) function. In the instant case, braking of the vehicle is performed as regenerative braking torque is increased as much as a brake pedal is depressed by a driver. When a bus runs along a route which frequently requires braking, such as a route having a lot of downhills, or a heavily congested route, regenerative braking is excessive, and thus, the degree of the charging load of the battery may be increased. When the endurance brake integration (EBI) function is turned off, the controller 300 may determine the charging C-rate again for a designated time. Upon concluding that the charging C-rate caused by charging of the battery and the regenerative braking of the vehicle is high even when the endurance brake integration (EBI) function is turned off, the controller 300 may reduce the regenerative braking amount of the vehicle by decreasing the regenerative braking level of the vehicle.

On the other hand, in the state in which the endurance brake integration (EBI) function was already turned off, the controller 300 may reduce the regenerative braking amount of the vehicle by determining the level of the regenerative braking and then decreasing the level of the regenerative braking of the vehicle. For example, in the case in which the current level of the regenerative braking of the vehicle is level 2, the controller 300 may adjust the current level of the regenerative braking of the vehicle to level 1, and in the case in which the current level of the regenerative braking of the vehicle is level 1, the controller 300 may adjust the current level of the regenerative braking of the vehicle to level 0. When the endurance brake integration (EBI) function is in the off state and the current level of the regenerative braking level of the vehicle is level 0, the controller 300 may determine that the regenerative braking of the vehicle is hardly performed. It will be apparent to those skilled in the art that the controller 300 may determine a proper regenerative braking amount of the vehicle depending on a driving route and a traffic situation, and may change control over the regenerative braking of the vehicle. After the controller 300 has reduced the regenerative braking amount of the vehicle, as described above, the controller 300 may determine influence of the reduced regenerative braking amount of the vehicle on the C-rate of the battery.

In another exemplary embodiment of the present disclosure, the controller 300 may derive an adaptive fuel cell stack variable output-type map in which the output of the fuel cell stack is variously adjusted by determining a mean output of the vehicle depending on a driving route of the vehicle in a fuel cell map, and may employ the adaptive fuel cell stack variable output-type map.

Next, a fuel cell vehicle control method S700 according to various exemplary embodiments of the present disclosure based on the above-described configuration of the fuel cell vehicle control system will be described with reference to FIG. 8.

Figure 8:
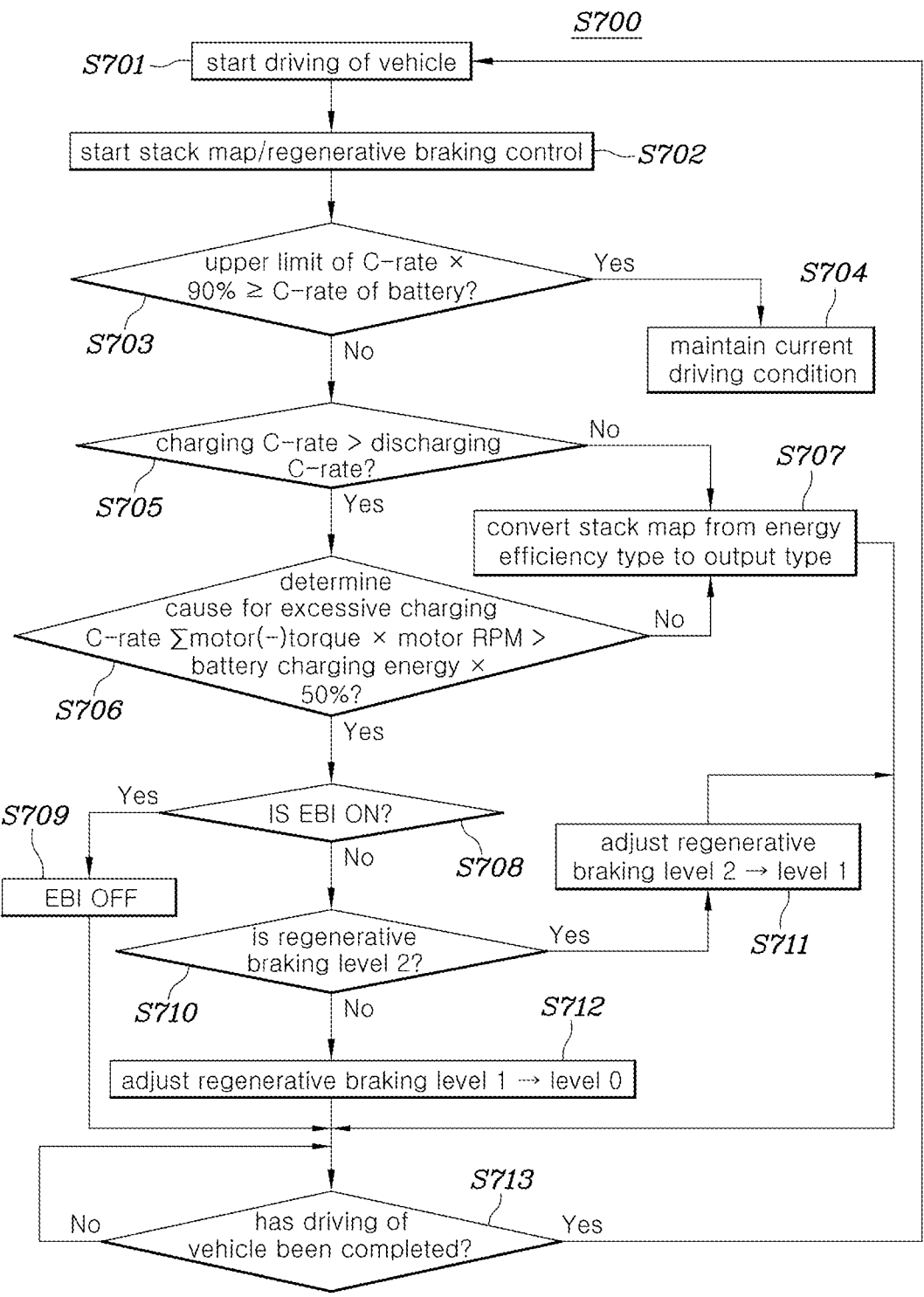
FIG. 8 is a flowchart representing a method of operating the fuel cell vehicle control system according to various exemplary embodiments of the present disclosure.

FIG. 8 is a flowchart representing a method of operating the fuel cell vehicle control system according to various exemplary embodiments of the present disclosure.

Referring to FIG. 8, first, the vehicle starts driving (S701). Thereafter, power generation of the fuel cells of the vehicle and the regenerative braking control of the vehicle may be started (S702). Thereafter, the monitoring unit 200 may determine the degree of the charging load and the degree of the discharging load of the vehicle (i.e., the C-rate of the battery), and the controller 300 may compare the determined C-rate of the battery with 90% of the predetermined upper limit of the C-rate of the battery (S703). Here, when the C-rate of the battery is equal to or less than 90% of the predetermined upper limit of the C-rate of the battery (Yes in S703), the controller 300 may determine that the degree of the charging load and the degree of the discharging load of the battery are not great, and may maintain the current driving condition of the vehicle (S704).

On the other hand, when the C-rate of the battery is greater than 90% of the predetermined upper limit of the C-rate of the battery (No in S703), the controller 300 may determine that the degree of the charging load and the degree of the discharging load of the battery are great, and may compare the charging and discharging loads of the battery with each other (S705). When the discharging C-rate is equal to or greater than the charging C-rate (No in S705), the controller 300 may change the fuel cell map of the vehicle from the energy efficiency-type map to the output-type map (S707).

On the other hand, when the charging C-rate is greater than the discharging C-rate (Yes in S705), the controller 300 may determine the degree of the regenerative braking of the vehicle, to determine whether or not the excessive charging load is caused by the regenerative braking of the vehicle or power generation of the fuel cell stack (S706).

The degree of the regenerative braking of the vehicle may be determined by comparing the regenerative braking amount of the vehicle expressed as a value, obtained by multiplying the torque of the motor, caused by counter electromotive force, by the revolutions per minute (rpm) of the motor, with 50% of the full SOC value of the battery while driving of the vehicle. When 50% of the full SOC value of the battery while driving of the vehicle is equal to or greater than the regenerative braking amount of the vehicle (No in S706), the controller 300 may determine that the output of the fuel cell stack is excessive, and may select the output-type map (S707).

On the other hand, when the regenerative braking amount of the vehicle is greater than 50% of the full SOC value of the battery while driving of the vehicle, the controller 300 may determine that half or more of the full SOC value of the battery results from the regenerative braking of the vehicle (Yes in S706). Thereafter, the controller 300 may determine whether or not the endurance brake integration (EBI) function of the vehicle is on or off (S708). Upon concluding that the endurance brake integration (EBI) function of the vehicle is on (Yes in S708), the controller 300 may reduce the regenerative braking amount of the vehicle by turning off the endurance brake integration (EBI) function (S709).

Upon concluding that the endurance brake integration (EBI) function of the vehicle is off (No in S708), the controller 300 may reduce the regenerative braking amount of the vehicle by determining the level of the regenerative braking and then decreasing the level of the regenerative braking of the vehicle. When the current level of the regenerative braking of the vehicle is level 2 (Yes in S710), the controller 300 may adjust the current level of the regenerative braking of the vehicle to level 1 (S711). When the current level of the regenerative braking of the vehicle is level 1 (No in S710), the controller 300 may adjust the current level of the regenerative braking of the vehicle to level 0 (S712).

Thereafter, the controller 300 may determine whether or not driving of the vehicle has been completed (S713). Upon concluding that driving of the vehicle has been completed (Yes in S713), the controller 300 may return the regenerative braking of the vehicle to an initial state exemplary by the driver, and may reset the fuel cell map to the energy efficiency-type map (Yes in S713).

In the fuel cell vehicle control system and method according to an exemplary embodiment of the present disclosure, a fuel cell map is selected depending on degrees of the charging and discharging loads of a vehicle battery, and thus, power generation of fuel cells may be controlled to reduce the load of the vehicle battery.

As is apparent from the above description, in a fuel cell vehicle control system and method according to an exemplary embodiment of the present disclosure, a fuel cell map is selected depending on degrees of the charging and discharging loads of a vehicle battery, and thus, power generation of fuel cells may be controlled, being configured for reducing the load of the vehicle battery and preventing a fire from breaking out due to overload of the battery.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A fuel cell vehicle control system comprising:
a map storage configured to store a plurality of fuel cell maps regarding power generation of fuel cells of a vehicle;
a monitoring unit configured to determine a degree of a charging load and a degree of a discharging load of a battery of the vehicle; and
a controller configured to select a fuel cell map from among the fuel cell maps stored in the map storage depending on the degree of the charging load and the degree of the discharging load of the battery of the vehicle, determined by the monitoring unit, and to control the power generation of the fuel cells depending on the selected fuel cell map,
wherein the monitoring unit is configured to determine charging and discharging currents per unit capacity of the battery of the vehicle as the degree of the charging load and the degree of the discharging load of the battery of the vehicle.

2. The fuel cell vehicle control system of claim 1, wherein the fuel cell maps include an output-type map configured so that an output of the fuel cells is varied depending on a demand output of the vehicle, and an energy efficiency-type map configured so that electrical energy efficiency of the vehicle is maximized.

3. The fuel cell vehicle control system of claim 1, wherein the charging and discharging currents of the battery of the vehicle are determined by Equation below, $$\sqrt{(\sum_{a=1}^{n} Da2 + \sum_{b=1}^{n} Cb2)/t},$$

wherein Da indicates discharging current by time, Cb indicates charging current by time, and t is a determination time.

4. The fuel cell vehicle control system of claim 1, wherein the controller is configured to compare the degree of the charging load and the degree of the discharging load of the battery with each other, and to select the output-type map stored in the map storage when the degree of the discharging load is greater than the degree of the charging load.

5. The fuel cell vehicle control system of claim 1, wherein the controller is configured to compare the degree of the charging load and the degree of the discharging load of the battery with each other, and to determine a degree of regenerative braking of the vehicle when the degree of the discharging load is less than the degree of the charging load.

6. The fuel cell vehicle control system of claim 5, wherein the controller is further configured to select the output-type map stored in the map storage or to reduce a regenerative braking amount of the vehicle depending on the determined degree of the regenerative braking of the vehicle.

7. The fuel cell vehicle control system of claim 6, wherein when a predetermined percentage of a full SOC value of the battery while driving of the vehicle is equal to or greater than the regenerative braking amount of the vehicle, the controller is configured to select the output-type map.

8. The fuel cell vehicle control system of claim 7, wherein when the regenerative braking amount of the vehicle is greater than the predetermined percentage of the full SOC value of the battery while driving of the vehicle, the controller is configured to reduce the regenerative braking amount of the vehicle.

9. The fuel cell vehicle control system of claim 8, wherein the controller is configured to reduce the regenerative braking amount of the vehicle by turning off an endurance brake integration (EBI) function of the vehicle, upon concluding that the endurance brake integration (EBI) function of the vehicle is on and thus the degree of the regenerative braking of the vehicle is maximized.

10. The fuel cell vehicle control system of claim 9, wherein the controller is configured to reduce the regenerative braking amount of the vehicle by decreasing a level of the regenerative braking of the vehicle, upon concluding that the endurance brake integration (EBI) function of the vehicle is off.

11. A fuel cell vehicle control method comprising:

determining, by a monitoring unit, a degree of a charging load and a degree of a discharging load of a battery of a vehicle;

selecting, by a controller, a fuel cell map from among a plurality of fuel cell maps regarding power generation of fuel cells of a vehicle, stored in a map storage depending on the degree of the charging load and the degree of the discharging load of the battery of the vehicle, determined by the monitoring unit; and controlling, by the controller, power generation of the fuel cells based on the selected fuel cell map, wherein, in determining the degree of the charging load and the degree of the discharging load of the battery of the vehicle, the monitoring unit is configured to determine charging and discharging currents per unit capacity of the battery of the vehicle as the degree of the charging load and the degree of the discharging load of the battery of the vehicle.

12. The fuel cell vehicle control method of claim 11, wherein the fuel cell maps include an output-type map configured so that an output of the fuel cells is varied depending on a demand output of the vehicle, and an energy efficiency-type map configured so that electrical energy efficiency of the vehicle is maximized, and wherein in selecting the fuel cell map from among the plurality of fuel cell maps stored in the map storage, the controller is configured to compare the degree of the charging load and the degree of the discharging load of the battery with each other, and to select the output-type map stored in the map storage when the degree of the discharging load is greater than the degree of the charging load.

13. The fuel cell vehicle control method of claim 11, further including:

comparing, by the controller, the degree of the charging load and the degree of the discharging load of the battery with each other, and determining a degree of regenerative braking of the vehicle when the degree of the discharging load is less than the degree of the charging load.

14. The fuel cell vehicle control method of claim 13, further including:

selecting, by the controller, the output-type map stored in the map storage or reducing a regenerative braking amount of the vehicle depending on the determined degree of the regenerative braking of the vehicle.

15. The fuel cell vehicle control method of claim 14, wherein when a predetermined percentage of a full SOC value of the battery while driving of the vehicle is equal to or greater than the regenerative braking amount of the vehicle, the controller is configured to select the output-type map.

16. The fuel cell vehicle control method of claim 14, wherein when the regenerative braking amount of the vehicle is greater than the predetermined percentage of the full SOC value of the battery while driving of the vehicle, the controller is configured to reduce the regenerative braking amount of the vehicle.

17. The fuel cell vehicle control method of claim 16, wherein, in reducing the regenerative braking amount of the vehicle, the controller is configured to reduce the regenerative braking amount of the vehicle by turning off an endurance brake integration (EBI) function of the vehicle, upon concluding that the endurance brake integration (EBI) function of the vehicle is on and thus the degree of the regenerative braking of the vehicle is maximized.

18. A non-transitory computer readable storage medium on which a program for performing the method of claim 11 is recorded.

* * * * *